(12) United States Patent
Kobayashi

(10) Patent No.: US 10,311,327 B2
(45) Date of Patent: Jun. 4, 2019

(54) IMAGE PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Satoru Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/280,032

(22) Filed: Sep. 29, 2016

(65) Prior Publication Data

US 2017/0098136 A1 Apr. 6, 2017

(30) Foreign Application Priority Data

Oct. 6, 2015 (JP) ................. 2015-198795

(51) Int. Cl.
G06K 9/00 (2006.01)
G06K 9/46 (2006.01)
G06T 7/11 (2017.01)

(52) U.S. Cl.
CPC .............. G06K 9/4652 (2013.01); G06T 7/11 (2017.01)

(58) Field of Classification Search
None
See application file for complete search history.

(56) References Cited

U.S. PATENT DOCUMENTS

| 5,854,860 A | 12/1998 | Kobayashi | |
| 2002/0090133 A1* | 7/2002 | Kim | G06K 9/342 382/164 |
| 2004/0047419 A1* | 3/2004 | Wakabayashi | H04N 5/144 375/240.16 |
| 2004/0086193 A1* | 5/2004 | Kameyama | G06T 3/4053 382/254 |
| 2007/0242875 A1* | 10/2007 | Tanaka | G06K 9/40 382/162 |
| 2010/0017389 A1* | 1/2010 | Ogunbona | G06F 17/30247 707/E17.03 |
| 2010/0060915 A1* | 3/2010 | Suzuki | G06K 9/00684 358/1.9 |
| 2010/0290716 A1* | 11/2010 | Mori | G06K 9/6255 382/309 |
| 2011/0202543 A1* | 8/2011 | Chin | G06F 17/30247 707/749 |

(Continued)

FOREIGN PATENT DOCUMENTS

JP 2007-158941 A 6/2007

*Primary Examiner* — Sean T Motsinger

(74) *Attorney, Agent, or Firm* — Venable LLP

(57) ABSTRACT

An image processing apparatus comprises: a colored level calculation unit configured to calculate, for a first region in an image, an index indicating a strength of color; a feature amount calculation unit configured to calculate a first feature amount relating to luminance components in each of the first region and a second region, and a second feature amount relating to color components in the regions; an interest level calculation unit configured to calculate an interest level for the first region based on a difference for the first feature amount between the regions, a difference for the second feature amount between the regions, and an importance for each of the differences; and a region of interest detection unit; wherein the interest level calculation unit determines the importance for the differences based on the index.

34 Claims, 5 Drawing Sheets

(56) References Cited

U.S. PATENT DOCUMENTS

| | | | |
|---|---|---|---|
| 2013/0051659 A1* | 2/2013 | Yamamoto | H04N 13/026 |
| | | | 382/154 |
| 2014/0184792 A1* | 7/2014 | Ogasawara | H04N 5/2621 |
| | | | 348/140 |
| 2016/0093064 A1 | 3/2016 | Kobayashi | |
| 2017/0098136 A1* | 4/2017 | Kobayashi | G06K 9/4652 |

* cited by examiner

BACKGROUND REGION
(HORIZONTAL CAPTURE)

DIVIDED BLOCK REGION

BACKGROUND REGION
(VERTICAL CAPTURE)

IMAGE PROCESSING APPARATUS, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium.

Description of the Related Art

In recent years, a technique for detecting an object region that is visually easy to notice out of object regions in an image as a region of interest (also called a region of interest detection technique) is known. Japanese Patent Laid-Open No. 2007-158941 discloses a technique for detecting a region of interest based on either a difference in luminance of a central portion of an image and a background portion that is a peripheral portion thereof (image edge portion), or a difference in color between the central portion of the image and the image edge portion.

In a method disclosed by Japanese Patent Laid-Open No. 2007-158941, there is a problem in that, while detection accuracy of colored objects decreases if a difference in luminance is emphasized, detection accuracy of colorless objects decreases if a difference in color information is emphasized, so a technique for causing detection accuracy for both of colored objects and colorless objects to improve is desired.

SUMMARY OF THE INVENTION

The present invention has been made in consideration of the aforementioned problems, and realizes a technique capable of more appropriately detecting both colored objects and colorless objects.

In order to solve the aforementioned problems, one aspect of the present invention provides an image processing apparatus comprising: a colored level calculation unit configured to calculate, for a first region in an image, an index indicating a strength of color that the first region has; a feature amount calculation unit configured to calculate a first feature amount relating to luminance components in each of the first region and a second region different to the first region, and a second feature amount relating to color components in the first region and the second region; an interest level calculation unit configured to calculate an interest level for the first region based on a difference for the first feature amount between the first region and the second region, a difference for the second feature amount between the first region and the second region, and an importance for each of the differences in feature amounts; and a region of interest detection unit configured to detect a region of interest in the image by using the interest level; wherein the interest level calculation unit determines, based on the index, the importance for the difference for the first feature amount and the importance for the difference for the second feature amount.

Another aspect of the present invention provides a control method of an image processing apparatus having: calculating, for a first region in an image, an index indicating a strength of color that the first region has; calculating a first feature amount relating to luminance components in each of the first region and a second region different to the first region, and a second feature amount relating to color components in the first region and the second region; calculating an interest level for the first region based on a difference for the first feature amount between the first region and the second region, a difference for the second feature amount between the first region and the second region, and an importance for each of the differences in feature amounts; and detecting a region of interest in the image by using the interest level; wherein the calculating of the interest level is determined based on the index, the importance for the difference for the first feature amount and the importance for the difference for the second feature amount.

Still another aspect of the present invention provides a non-transitory computer-readable storage medium storing a program for causing a computer to execute a control method of an image processing apparatus having: calculating, for a first region in an image, an index indicating a strength of color that the first region has; calculating a first feature amount relating to luminance components in each of the first region and a second region different to the first region, and a second feature amount relating to color components in the first region and the second region; calculating an interest level for the first region based on a difference for the first feature amount between the first region and the second region, a difference for the second feature amount between the first region and the second region, and an importance for each of the differences in feature amounts; and detecting a region of interest in the image by using the interest level; wherein the calculating of the interest level is determined based on the index, the importance for the difference for the first feature amount and the importance for the difference for the second feature amount.

According to the present invention, it is possible to more appropriately detect both colored objects and colorless objects.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

First Embodiment

Exemplary embodiments of the present invention will be described hereinafter in detail, with reference to the accompanying drawings. Note that, as an example of an image processing apparatus, explanation is given below of an example of applying the present invention to a digital camera that can obtain a captured image. However, the present invention is not limited to a digital camera, and can be applied to any device capable of obtaining a captured image. Such devices may include a mobile telephone, a game device, a tablet terminal, a personal computer, a watch-type or glasses-type information terminal, an in-vehicle device, or the like, for example.

(Configuration of a Digital Camera 100)

Figure 1:
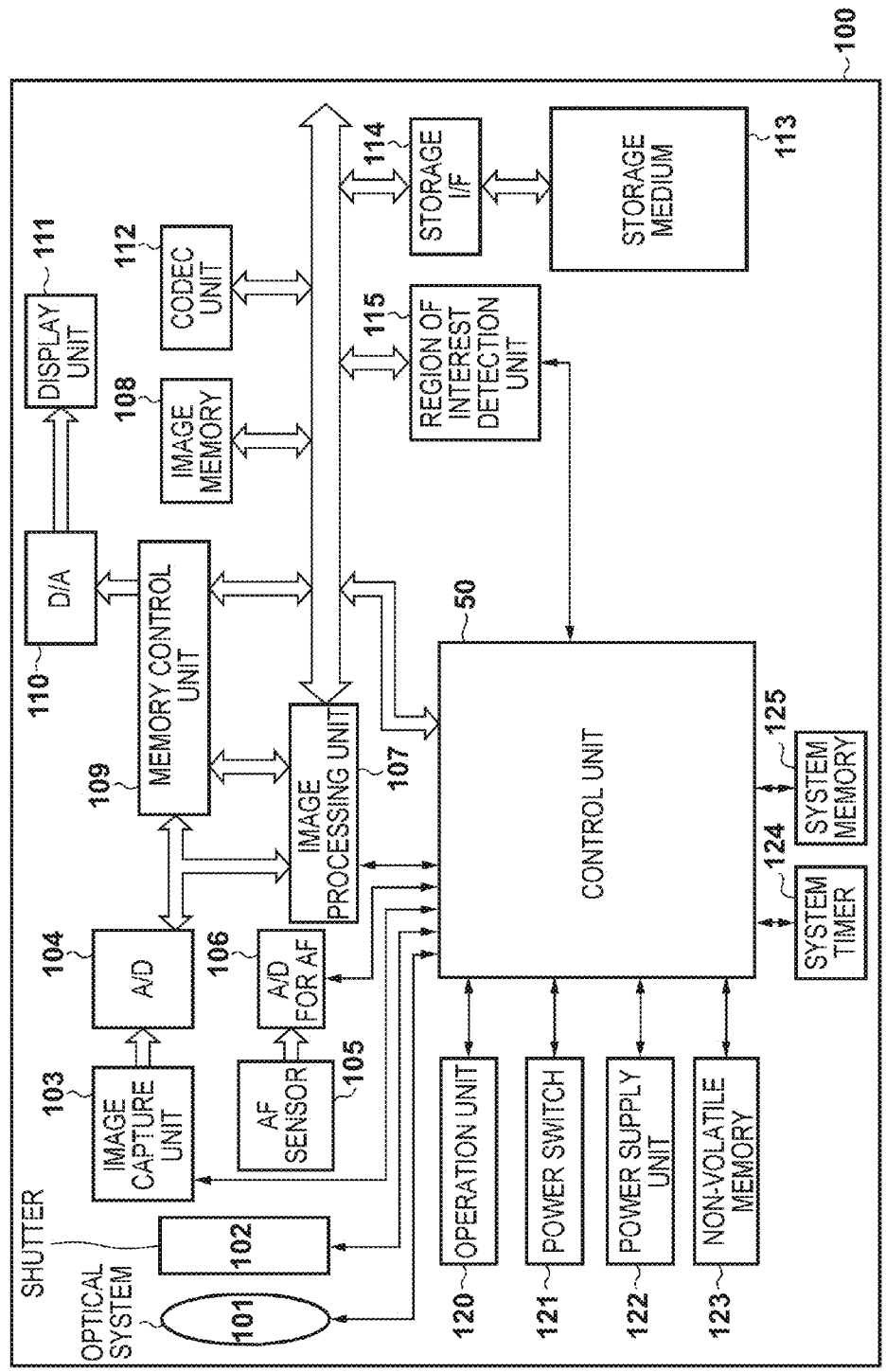
FIG. 1 is a block diagram illustrating a functional configuration example of a digital camera as an example of an image processing apparatus according to embodiments of the present invention.

FIG. 1 is a block diagram illustrating a functional configuration example of a digital camera 100 as an example of an image processing apparatus of the present embodiment. Note that one or more of the functional blocks shown in FIG. 1 may be realized by hardware such as an ASIC, a programmable logic array (PLA), or the like, and may be realized by a programmable processor such as a CPU, an MPU, or the like, executing software. Also, these may be realized by a combination of software and hardware. Accordingly, in the following explanation, even in a case where different functional blocks are recited as the subject of operations, it is possible that this may be realized by the same hardware as the subject.

An optical system 101 is equipped with an imaging optical system that includes a zoom lens and a focus lens, and focuses a light beam from an object. A shutter 102 includes an aperture function, and controls a charge accumulation period and a quantity of incident light with respect to an image capture unit 103, for example. The image capture unit 103 includes an image capturing element for which a plurality of pixels that have a photoelectric conversion element are two-dimensionally arranged, and photoelectrically converts, by the pixels, an optical image of an object formed by the optical system 101 to output an analog image signal. The image capturing element may be an image capturing element such as a CCD (Charge-Coupled Device) image sensor, a CMOS (Complementary Metal Oxide Semiconductor) image sensor, or the like.

An A/D conversion unit 104 converts the analog signal output by the image capture unit 103 into a digital signal, and outputs image data at a pixel unit. An AF sensor 105 includes a CCD image sensor, a CMOS image sensor, or the like for converting the optical image of an object into an electric signal and outputting an image signal for performing AF (Auto Focus) control. An AF A/D conversion unit 106 converts the analog signal output by the AF sensor 105 into a digital signal, and outputs image data at a pixel unit.

An image processing unit 107 includes a signal processing circuit or a signal processing module, and performs various image processing such as, for example, white balance processing or γ processing to the image data output from the A/D conversion unit 104.

An image memory 108 includes a volatile storage medium such as a semiconductor memory, and temporarily stores image data or the like. A memory control unit 109 controls reading or writing of data with respect to the image memory 108. A D/A conversion unit 110 converts an input digital signal into an analog signal, and outputs an analog image signal.

A display unit 111 includes a display panel such as an LCD for example, and displays an input image signal, a display menu, or the like. A codec unit 112 includes a signal processing circuit or a signal processing module, and encodes input image data or video data, based on a predetermined standard such as JPEG or MPEG, for example.

A storage medium 113 includes a non-volatile storage apparatus such as a memory card or a hard disk, and records captured image data or video data, for example. A storage I/F 114 includes an interface with respect to the storage medium 113, and controls reading or writing of data with respect to the storage medium 113.

A region of interest detection unit 115 includes a signal processing circuit or a signal processing module, and performs later-described region of interest detection processing to detect a region of interest in image data. A control unit 50 includes a CPU or an MPU, for example, and controls the digital camera 100 overall by loading a program stored in a non-volatile memory 123 into a work area of a system memory 125, and executing it. In the present embodiment, explanation is given that distinguishes the region of interest detection unit 115 from the control unit 50, but the control unit 50 may execute functions of the region of interest detection unit 115.

An operation unit 120 includes mechanical members, such as a switch or a dial, or a touch panel included in the display unit 111, and detects an operation instruction from a user which it notifies to the control unit 50. A power switch 121 is a button for controlling activation and termination of the digital camera 100, and may be included in the operation unit 120. A power source unit 122 includes a battery, and supplies power to each unit of the digital camera 100.

The non-volatile memory 123 includes an EEPROM or the like for example, and is a non-volatile storage medium that is capable of electrically recording and deletion. A system timer 124 measures time used in various types of control, or time of an integrated clock. The system memory 125 includes a volatile storage medium, and in addition to being caused to temporarily store variables, constants, or the like used when the control unit 50 causes a program to operate, it is used when loading a program or the like that has been read from the non-volatile memory 123.

Additionally, explanation regarding basic operation at a time of capturing by each unit of the digital camera 100 described above will be given.

Firstly, the image capture unit 103 photo-electrically converts a light beam incident via the optical system 101 and the shutter 102, and outputs it as an input image signal to the A/D conversion unit 104. The A/D conversion unit 104 converts the analog image signal output by the image capture unit 103 into a digital image signal, and outputs to the image processing unit 107.

The AF sensor 105 receives light incident via the optical system 101 and the shutter 102 by a plurality of symmetrical line sensors, and outputs it to the AF A/D conversion unit 106. The AF A/D conversion unit 106 converts the analog signal output by the AF sensor 105 into a digital signal, and outputs to the control unit 50. The control unit 50 realizes so-called phase difference AF control by detecting a relative position shift amount in a division direction for the light beam from the object, based on an image signal output from a pair of line sensors.

The image processing unit 107 applies the above-described various types of image processing to image data from the A/D conversion unit 104 or image data read from the memory control unit 109, and outputs image data that is a processing result. The memory control unit 109 writes image data output from the image processing unit 107 to the image memory 108. The image processing unit 107 uses image data captured by the image capture unit 103 to perform predetermined calculations, and performs focus control or exposure control for AE (auto exposure) and AF (auto focus), for example, based on a calculation result obtained by the control unit 50.

The image memory 108 stores, for displaying in the display unit 111, image data captured by the image capture unit 103, or image data read from the storage medium 113. In addition, the D/A conversion unit 110 converts image data for display that has been read from the image memory 108 into an analog image signal, and supplies it to the display unit 111. The display unit 111 displays the analog image signal output from the D/A conversion unit 110 on a display panel such as an LCD.

The region of interest detection unit 115 performs later-described region of interest detection processing with respect to input image data. The region of interest detection unit 115 detects a region of interest in the image data, and outputs region of interest information to the control unit 50. Based on the obtained region of interest information, the control unit 50 performs predetermined processing, for example if a plurality of objects are present in the image data, AF control so as to cause focusing to an object that belongs to a region of interest, or AE control so that the object belonging to the region of interest becomes an adequate brightness.

(Configuration of Region of Interest Detection Unit 115 and Series of Operations for Region of Interest Detection Processing)

Next, explanation is given regarding the configuration of the region of interest detection unit 115 and a series of operations for the region of interest detection processing.

Figure 2:
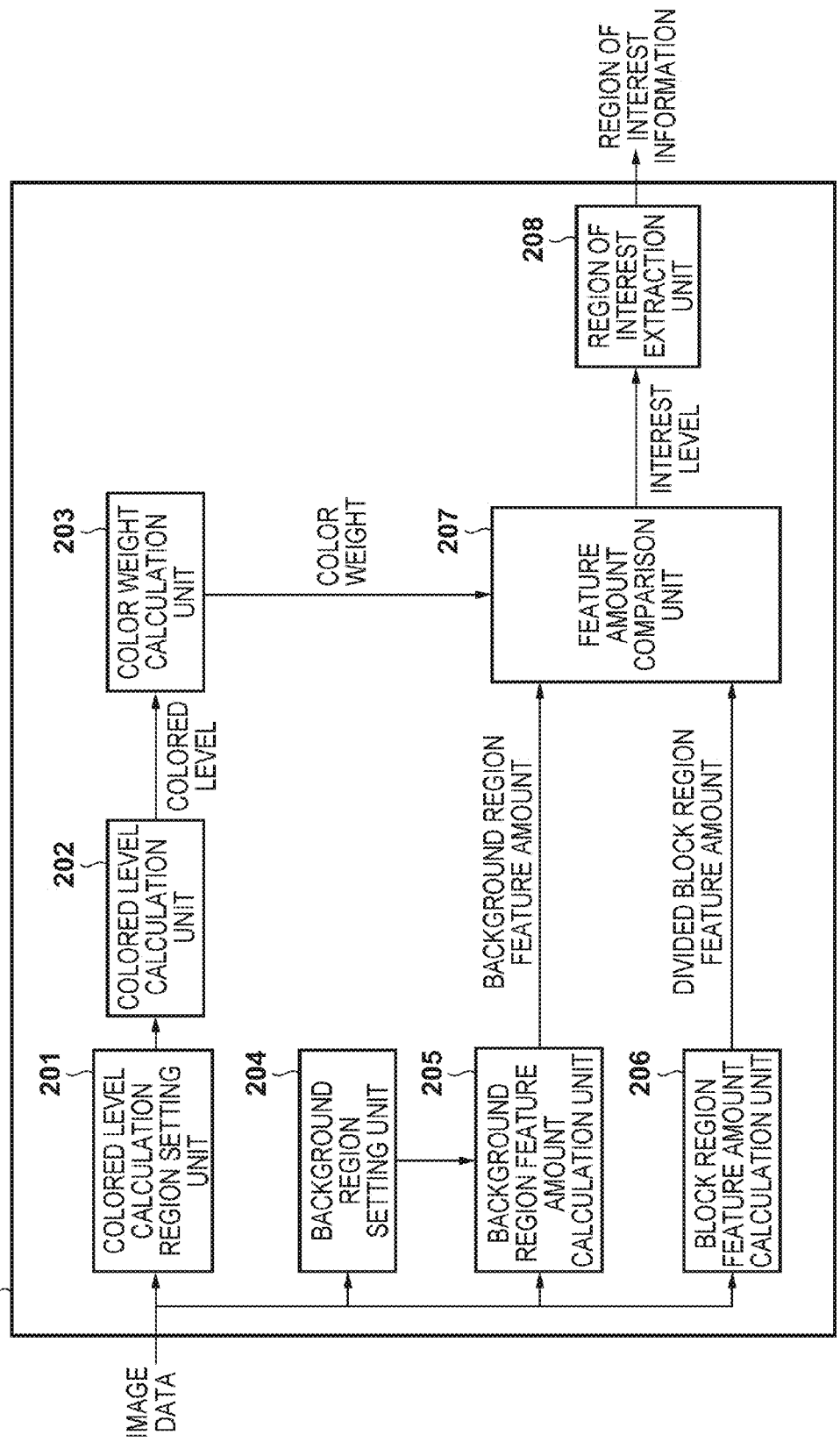
FIG. 2 is a block diagram illustrating a functional configuration example of a region of interest detection unit 115 according to embodiments.
Figure 3:
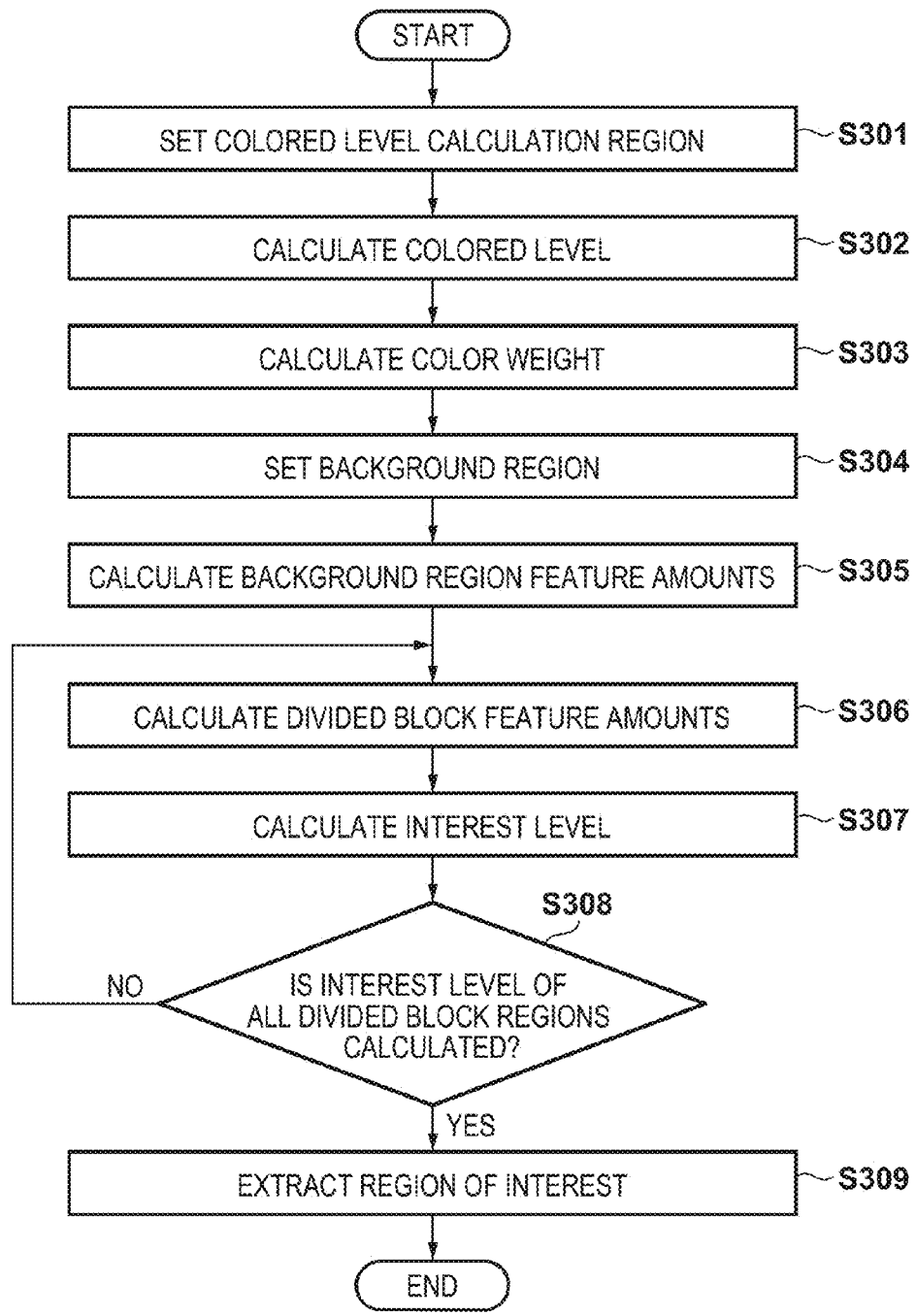
FIG. 3 is a flowchart for illustrating a series of operations for region of interest detection processing according to embodiments.

Firstly, FIG. 2 illustrates a functional configuration example of the region of interest detection unit 115. The region of interest detection unit 115 includes a colored level calculation region setting unit 201, a colored level calculation unit 202, a color weight calculation unit 203, a background region setting unit 204, a background region feature amount calculation unit 205, a block region feature amount calculation unit 206, a feature amount comparison unit 207, and a region of interest extraction unit 208. For detailed operation of each unit that configures the region of interest detection unit 115, explanation is given below while explaining a series of operations for region of interest detection processing, which is explained with reference to FIG. 3.

Note that the series of operations for region of interest detection processing are started by the region of interest detection unit 115 in accordance with an instruction by the control unit 50 if there is a user operation that is an image capturing instruction with respect to the operation unit 120, for example. In addition, the series of operations are realized by the region of interest detection unit 115 executing a stored program, for example.

In step S301, the colored level calculation region setting unit 201 sets a region for which to calculate a colored level from regions in an image. The colored level calculation region setting unit 201 sets the region for which to calculate a colored level (a colored level calculation region) based on visual impact, for example.

Figure 4A:
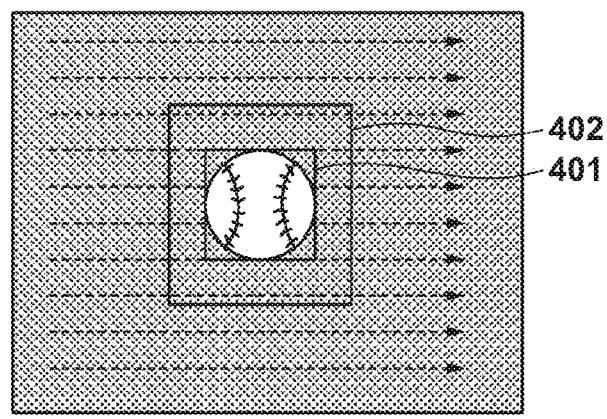
FIGS. 4A through 4B are views for describing calculation processing of visual impact according to embodiments.
Figure 4B:
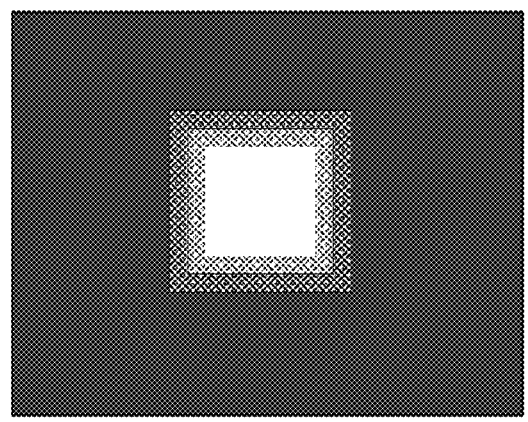

Firstly, regarding processing to calculate visual impact, explanation is given with reference to FIG. 4A and FIG. 4B. FIG. 4A exemplifies, from regions in an image, an inner region 401 and a surrounding region 402 for calculating visual impact, and FIG. 4B exemplifies calculated visual impact by using grayscale pixel values for each region in the image. Note that, for FIG. 4B, illustration is such that visual impact increases as whiteness increases, and visual impact decreases as blackness increases.

The colored level calculation region setting unit 201 scans the inner region 401 and the surrounding region 402, which are predetermined, from top-left to bottom-left for regions in an image, and compares a feature amount for the inner region 401 with a feature amount for the surrounding region 402 at each position while scanning. While a concrete example for feature amounts is described below, the colored level calculation region setting unit 201 determines that a current position of the inner region 401 is an easy to notice region and gives a large visual impact when a difference between the feature amount of the inner region 401 and the feature amount of the surrounding region 402 is greater than a predetermined value. Conversely, if the difference between the feature amount of the inner region 401 and the feature amount of the surrounding region 402 is small, the colored level calculation region setting unit 201 determines the current position to be a difficult to notice region and gives a small visual impact.

In the example illustrated in FIG. 4A in which a ball is present in the background, if the inner region 401 is positioned in the vicinity of the ball, the difference between the feature amount of the inner region 401 and the feature amount of the surrounding region 402 becomes large, and visual impact is set to a large value. However, if the inner region 401 is positioned at other than in the vicinity of the ball, the difference between the feature amount of the inner region 401 and the feature amount of the surrounding region 402 becomes small, and visual impact is set to a small value.

For the feature amount used in calculation of visual impact, it is possible to use at least one of an edge amount, a pixel value average, and a histogram in the inner region 401 and the surrounding region 402, for example.

For example, if using, as a feature amount, a histogram illustrating a pixel value distribution relating to a color component or a luminance component for example, an example of calculating visual impact is as follows. The colored level calculation region setting unit 201 calculates, at a position in the image, each of a histogram illustrating a pixel value distribution in the inner region 401 and a histogram illustrating a pixel value distribution in the surrounding region 402, and an absolute difference for a count value of a number of pixels for example is obtained for each element of the histograms. A value that accumulates the absolute differences obtained for all elements of the histogram is assumed to be the visual impact at one position.

In addition, if using a pixel value average as a feature amount, visual impact is calculated by using an absolute difference of the pixel value average of each region, for example. Specifically, the colored level calculation region setting unit 201 obtains, at a position in the image, an absolute difference between a pixel value average in the inner region 401 and a pixel value average in the surrounding region 402, and sets the obtained value as the visual impact at one position. Note that, as a pixel value average, an average value of luminance or an average value of chroma, for example, are given. Chroma is calculated as in Equation (1) below, for example.

$$\text{Chroma} = Cb + Cr \quad (1)$$

It is possible to obtain in accordance with a sum of two color difference signals.

If using an edge amount as a feature amount, visual impact is calculated by using an absolute difference of the accumulated value of the edge strength of each region, for example. Specifically, the colored level calculation region setting unit 201 obtains, at a position in the image, an absolute difference between an accumulated value for edge strength in the inner region 401 and an accumulated value for edge strength in the surrounding region 402, and sets the obtained value as the visual impact at one position. Note that edge strength can be calculated by using a publicly known method such as a Sobel filter, for example.

The colored level calculation region setting unit 201 sets as a colored level calculation region a region for which visual impact is high, based on visual impact with respect to all regions in the image calculated by the processing described above.

Note that setting of the colored level calculation region is not limited to the method based on visual impact described above, and configuration may be taken to set a candidate region that possibly is a region of interest as the colored level calculation region. For example, configuration may be taken to set, as a colored level calculation region, a region of interest candidate region—in other words an in-focus region or a screen central region—that is output by a candidate region detection unit (not shown) in the control unit 50. In addition, configuration may be such that, if a plurality of pieces of frame information can be used such as at a time of capturing of a moving image, a candidate region corresponding to a region of interest detected in a frame that is temporally neighboring is set as a colored level calculation region. In addition, if it is possible to track a predetermined object by a matching process between frames, configuration may be taken to set a tracking object region that has been tracked as a colored level calculation region.

In step S302, the colored level calculation unit 202 calculates a colored level of the region set by the colored level calculation region setting unit 201. Note that, in the present embodiment, an index expressing a level of color that a predetermined region has is set as the colored level, and the colored level calculation unit 202 calculates a chroma average value (average value for pixel value of a color component) in the region, for example. At this point, the larger the chroma average value is for a region, the higher the colored level becomes.

In step S303, the color weight calculation unit 203 calculates a color weight based on the colored level calculated by the colored level calculation unit 202. The color weight calculation unit 203 can calculate the color weight in accordance with Equation (2), for example.

$$\text{Color weight} = a \times \text{the colored level} + b \ (a \text{ and } b \text{ are constant}) \qquad (2)$$

Figure 5:
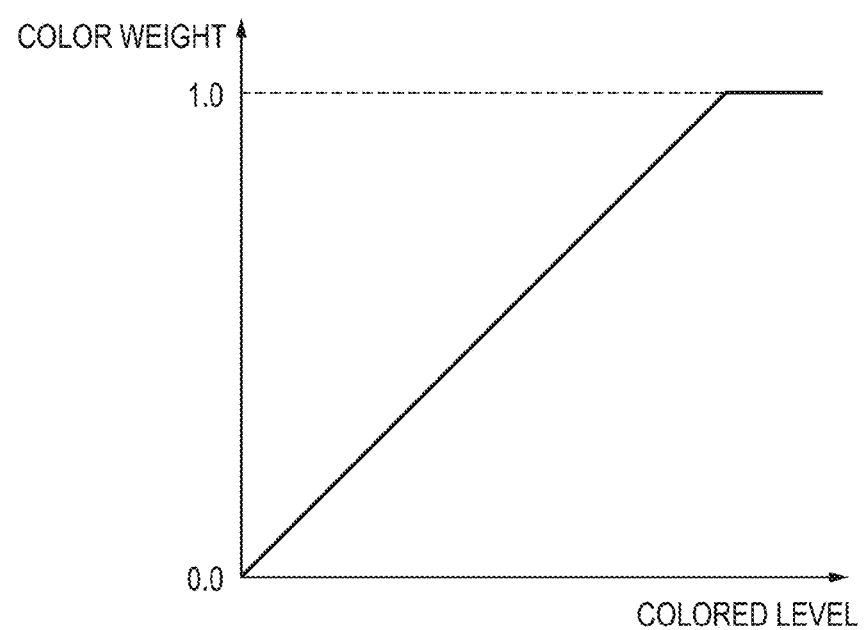
FIG. 5 is a graph for describing an example of calculating a color weight according to embodiments.

A relation between colored level and color weight according to the present embodiment, for example, is exemplified in FIG. 5. The color weight has a correlation proportional to the colored level, for example. Specifically, the color weight is a weighting coefficient that increases or decreases in accordance with an index that indicates the strength of color that a region has, and is determined to be a small value when the colored level is small, and conversely a large value when the colored level is large.

Figure 6A:
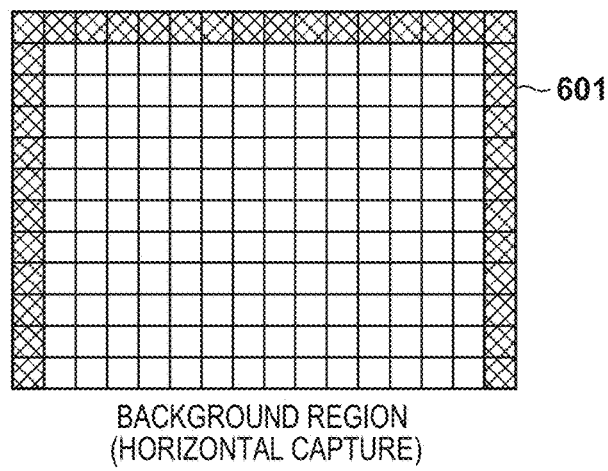
FIGS. 6A through 6C are views for describing a background region and a divided block region according to embodiments.

In step S304, the background region setting unit 204 estimates the background of the region in the image to set a background region. Specifically, the background region setting unit 204 sets as the background region a region that is in contact with an end portion of the image (specifically, at least one of an upper end, a lower end, a left end, and a right end), as with a region 601 illustrated by hatching in FIG. 6A. The example of FIG. 6A illustrates an example in which the left end, upper end, and right end of the regions in the image are set as the background region. Configuration may be taken to use another method to set the background region, and change setting of the background region by using information of a capturing orientation of the digital camera 100 (horizontal capturing, vertical capturing), for example. Specifically, end regions for other than in the ground direction for a sky/ground orientation are set as the background region. In a case of horizontal capturing, the end region as in FIG. 6A is set as the background region, and in a case of vertical capturing an end region 602 as in FIG. 6C is set as the background region. In addition, as another method, configuration may be such that brightness for end regions of an image is calculated, and an end region for which the brightness is greater than a predetermined value is set as the background region. By this it becomes easy to set a bright region such as the sky as the background.

In step S305, the background region feature amount calculation unit 205 calculates each of a feature amount of a luminance component and a feature amount of a color component for the background region set by the background region setting unit 204. Regarding calculating the feature amount of a luminance component and the feature amount of a color component, explanation is given later in step S306.

Figure 6B:
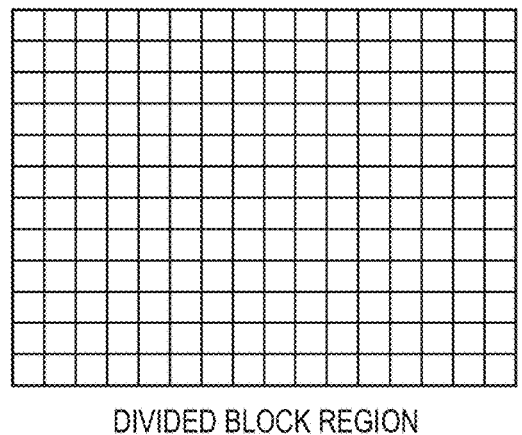
Figure 6C:
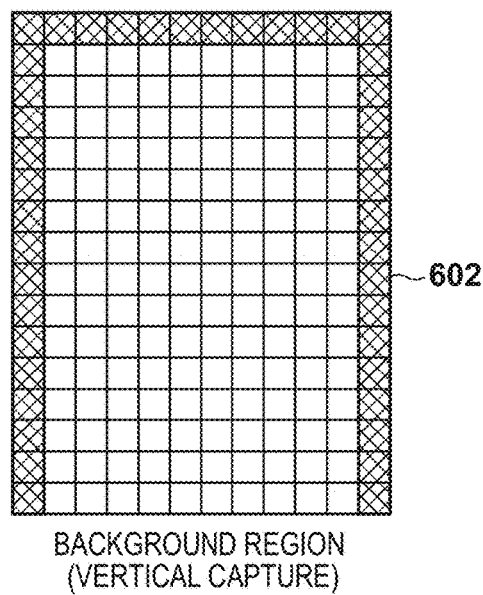

In step S306, the block region feature amount calculation unit 206 calculates each of the feature amount for the luminance component and the feature amount for the color component for each block region obtained by dividing the regions in the image into partial regions of a predetermined size, as illustrated in FIG. 6B, for example. In the calculation of the feature amount of the luminance component and the feature amount of the color component according to the present embodiment, it is possible to use at least one of a histogram, a pixel value average, and an edge amount in the region, for example.

For example, if using a histogram as a feature amount, the background region feature amount calculation unit 205 calculates a histogram illustrating a pixel distribution of luminance components in the background region, and a histogram illustrating a pixel distribution of color components. In addition, the block region feature amount calculation unit 206 calculates for each divided block region a histogram illustrating the pixel value distribution of luminance components, and a histogram illustrating a pixel value distribution of color components.

In addition, if using a pixel value average as a feature amount, the background region feature amount calculation unit 205 calculates, for the background region, a pixel value average of luminance components and a pixel value average of color components. In addition, the block region feature amount calculation unit 206 calculates for each divided block region a pixel value average of luminance components, and a pixel value average of color components. Note that, as described above, it is possible to use an average value of luminance or an average value of chroma, for example, in the pixel value average.

If using an edge amount as a feature amount, the background region feature amount calculation unit 205 calculates an accumulated value of edge strength of the luminance component, and an accumulated value of edge strength of the color component, in the background region. In addition, the block region feature amount calculation unit 206 calculates the accumulated value of edge strength of the luminance component and the accumulated value of edge strength of the color component for each divided block region. Note that as described above, the calculation of edge strength can be calculated by using a publicly known method such as a Sobel filter, for example.

In step S307, the feature amount comparison unit 207 calculates an interest level for a block region that is a processing target. In this interest level calculation processing, the feature amount comparison unit 207 obtains comparison results by comparing, for each of the luminance component and the color component, the background region feature amount calculated in step S305 and the feature amount for the block region calculated in step S306. Furthermore, the color weight calculated in step S303 is used to calculate an interest level that adds an importance to each comparison result. Specifically, the interest level is calculated in accordance with Equation (3).

Interest level=(1−color weight)×difference in luminance feature amount+color weight×difference in color feature amount (3)

In other words, the color weight is used to perform a weighted addition for each of the difference between the luminance feature amount of the background region and the luminance feature amount of the block region, as well as the difference between the color feature amount of the background region and the color feature amount of the block region.

With such a configuration, respective importances for the difference in the luminance feature amount and the difference in the color feature amount are adjusted in accordance with the color weight. In other words, as the color weight of the candidate region increases an interest level resulting from the importance of the difference of color feature amounts increasing is calculated, and as the color weight of the candidate region decreases an interest level resulting from the importance of the difference of luminance feature amounts increasing is calculated. In other words, if the color weight of the candidate region is high, it is possible to use the difference of color feature amounts to detect a colored object, and conversely if the color weight of the candidate region is low, it is possible to user the difference of luminance feature amounts to detect a colorless object.

Furthermore, explanation is given regarding an example in which the feature amount comparison unit 207 calculates the difference of luminance feature amounts and the difference of color feature amounts.

For example, if using a histogram as a feature amount, in a calculation of the difference of luminance feature amounts, the feature amount comparison unit 207 uses a histogram indicating a pixel distribution of luminance components in the background region and a histogram indicating a pixel distribution of luminance components in a divided block region to obtain an absolute difference between a count value of each element of the histograms. A value accumulated for all histogram constituent elements is set as the difference of the luminance feature amounts for a divided block region. Similarly, in the calculation of the difference of color feature amounts, for a color histogram indicating pixel distribution of color components in the background region and a color histogram indicating a pixel distribution of color components in the divided block region, the feature amount comparison unit 207 obtains an absolute difference between count values of each element of the histograms. A value accumulated for all histogram constituent elements is set as the difference of the color feature amounts for a divided block region.

In addition, if using a pixel value average as a feature amount, the feature amount comparison unit 207 obtains, in the calculation of the difference in luminance feature amounts, an absolute difference between a luminance average value in the background region and a luminance average value in the divided block region. The obtained value is set as the difference in luminance feature amounts for a divided block region. Similarly, in the calculation in the difference of color feature amounts, the feature amount comparison unit 207 obtains an absolute difference between a color average value in the background region and a color average value in a divided block region, and sets the obtained value as the difference in color feature amounts for the divided block region.

If using an edge amount as a feature amount, the feature amount comparison unit 207 obtains, in the calculation of the difference in luminance feature amounts, an absolute difference between an accumulated value for luminance edge strength in the background region and an accumulated value for luminance edge strength in the divided block region. The feature amount comparison unit 207 sets the obtained value as the difference in luminance feature amounts for a divided block region. In addition, in the calculation of the difference in color feature amounts, the feature amount comparison unit 207 obtains an absolute difference between an accumulated value for color edge strength in the background region and an accumulated value for color edge strength in the divided block region, and sets the obtained value as the difference in color feature amounts for one divided block region.

In step S308, the feature amount comparison unit 207 determines whether an interest level has been calculated for all divided block regions. The feature amount comparison unit 207 refers to a current location for a processing target region, for example, and if it determines that interest levels for all divided block regions have not been calculated, the processing is returned to step S306, and the processing of step S306 and step S307 is repeated. However, if it is determined that interest levels have been calculated for all divided block regions, the processing proceeds to step S309.

In step S309, the region of interest extraction unit 208 extracts regions of interest based on the interest levels calculated by the feature amount comparison unit 207. Specifically, if the interest level for each divided block region is greater than a predetermined threshold, the block region is extracted as a region of interest. The region of interest extraction unit 208 outputs region of interest information that indicates block regions extracted as regions of interest. Upon the region of interest information being output, the region of interest detection unit 115 terminates the series of operations for this processing.

Note that, in the explanation of the present embodiment, explanation is given of an example of performing a weighted addition based on the color weight of the difference of luminance feature amounts and the difference of color feature amounts, as an example of calculating the interest level in step S307. However, in the calculation of a feature amount, a feature amount that considers a color weight may be calculated. Specifically, configuration may be taken such that, when calculating a feature amount in step S304 and in step S305, to calculate the feature amount after multiplying each component of the image by a gain value in accordance with the color weight, and, in the calculation of the interest level in step S307, to equalize the importance of the difference of the feature amount of luminance components and the difference of the feature amount of color components.

As explained above, in the present embodiment, configuration is taken to detect a region of interest by adjusting—in accordance with a color weight of a candidate region—the importance of the feature amount of luminance components and the importance of the feature amount of color components. Specifically, if the region of an object is a colorless object, because the color weight becomes small, importance of the difference of luminance feature amounts becomes large, and an interest level that values the difference of luminance feature amounts is calculated. In such a case, it is possible to appropriately detect a colorless object as a region of interest. However, if the region of an object is a colored object, because the color weight becomes large, importance of the difference of color feature amounts becomes large, and an interest level that values the difference of color feature amounts can be calculated. In such a case, it is possible to appropriately detect a colored object as a region of interest. In other words, it is possible to more appropriately detect both of colored objects and colorless objects.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-198795, filed Oct. 6, 2015, which is hereby incorporated by reference herein in its entirety.

What is claimed is:

1. An image processing apparatus comprising:
a memory configured to store instructions; and
a processor connected to the memory and configured to execute the instructions to:
calculate an impact of an image, detect a candidate region for a region of interest in the image based on the impact, and set the detected candidate region as a first region that is part of the image;
calculate a first feature amount relating to luminance components in each of the first region and a second region that is a different part of the image to the first region, and a second feature amount relating to color components in each of the first region and the second region;
calculate a strength of color in the first region in the image;
calculate an interest level for the first region based on a difference for the first feature amount between the first region and the second region, a difference for the second feature amount between the first region and the second region, and an importance for each of the differences in the first and second feature amounts, wherein the importance for the difference for the first feature amount and the importance for the difference for the second feature amount is determined based on the strength of color; and
detect the region of interest in the image by using the interest level.

2. The apparatus according to claim 1, wherein the processor executes further instruction to, as the strength of color increases, cause the importance for the difference for the first feature amount to decrease and also cause the importance for the difference for the second feature amount to increase, and, as the strength of color decreases, cause the importance for the difference for the first feature amount to increase and also cause the importance for the difference for the second feature amount to decrease.

3. The apparatus according to claim 2, wherein the processor executes further instruction to use the importance of the difference of the first feature amount and the importance of the difference of the second feature amount to perform a weighted addition of the difference of the first feature amount and the difference of the second feature amount.

4. The apparatus according to claim 1, wherein the processor executes further instruction to multiply a gain value in accordance with the strength of color and each of the first feature amount and the second feature amount of the second region, and to equalize the importance of the difference of the first feature amount and the importance of the difference of the second feature amount in the calculating the interest level.

5. The apparatus according to claim 1, wherein the processor executes further instruction to detect as the candidate region a region of at least one of an in-focus region, a screen central region, and a tracked object region in the image, or a region corresponding to the region of interest in a temporally neighboring frame in a moving image.

6. The apparatus according to claim 1, wherein the second region is a background region in the image.

7. The apparatus according to claim 6, wherein the background region is a partial region that includes at least an end portion of the image.

8. The apparatus according to claim 1, wherein the processor executes further instruction to use a luminance component to calculate as the first feature amount at least one of a pixel value average, a histogram illustrating a pixel distribution, and an edge amount, and to use a color component to calculate as the second feature amount that corresponds to the first feature amount at least one of a pixel value average, a histogram illustrating the pixel distribution and an edge amount.

9. The apparatus according to claim 1, wherein the processor executes further instruction to use an average value of the chroma of the first region to calculate the strength of color.

10. A control method of an image processing apparatus, the control method comprising:
calculating an impact of an image, detecting a candidate region for a region of interest in the image based on the impact, and setting the detected candidate region as a first region that is part of the image;
calculating a first feature amount relating to luminance components in each of the first region and a second region that is a different part of the image to the first region, and a second feature amount relating to color components in each of the first region and the second region;

calculating a strength of color in the first region in the image;

calculating an interest level for the first region based on a difference for the first feature amount between the first region and the second region, a difference for the second feature amount between the first region and the second region, and an importance for each of the differences in the first and second feature amounts, wherein the importance for the difference for the first feature amount and the importance for the difference for the second feature amount is determined based on the strength of color;

detecting the region of interest in the image by using the interest level.

11. A non-transitory computer-readable storage medium storing a program for causing a computer to execute a control method of an image processing apparatus, the control method comprising:

calculating an impact of an image, detecting a candidate region for a region of interest in the image based on the impact, and setting the detected candidate region as a first region that is part of the image;

calculating a first feature amount relating to luminance components in each of the first region and a second region that is a different part of the image to the first region, and a second feature amount relating to color components in each of the first region and the second region;

calculating a strength of color in the first region in the image;

calculating an interest level for the first region based on a difference for the first feature amount between the first region and the second region, a difference for the second feature amount between the first region and the second region, and an importance for each of the differences in the first and second feature amounts, wherein the importance for the difference for the first feature amount and the importance for the difference for the second feature amount is determined based on the strength of color;

detecting the region of interest in the image by using the interest level.

12. The apparatus according to claim 1, wherein the processor executes further instruction to calculate an impact for each of the regions of the image, and to detect at least one of the regions with the maximum impact as the candidate region for the region of interest.

13. The apparatus according to claim 12, wherein the processor executes further instruction to calculate, for each region of the image, the impact using a difference for a feature amount in an inner region and a surrounding region of the each region, wherein the feature amount is at least one of a pixel value average, a histogram indicating a pixel value distribution and an edge amount.

14. The apparatus according to claim 1, further comprising an image sensor constructed to capture the image, wherein focus for the image sensor is determined based on the detected region of interest in the image.

15. The apparatus according to claim 1, further comprising an image sensor constructed to capture the image, wherein exposure for the image sensor is determined based on the detected region of interest in the image.

16. The apparatus according to claim 3, wherein the processor executes further instruction to calculate the interest level by using the importance of the difference of the first feature amount and the important of the difference of the second feature amount to perform a weighted addition of the difference of the first feature amount and the difference of the second feature amount.

17. The apparatus according to claim 1, wherein the processor executes further instruction to calculate a first weight for the difference for the first feature amount and a second weight for the difference for the second feature amount, based on the strength of color; and to calculate the interest level based on the first weight and the second weight.

18. An image processing apparatus comprising:

a memory configured to store instructions; and a processor connected to the memory and configured to execute the instructions to:

determine an index of a region of an image using a difference between a feature amount of an inner region for the region and a feature amount of a surrounding region for the region, the feature amount including at least one of a pixel value average; a histogram indicating a pixel value distribution and an edge amount, detect at least one region among the regions of the image on the index as a candidate region of interest in the image, and set the detected candidate region as a first region that is part of the image;

determine a first feature amount relating to luminance components in each of the first region and a second region that is a different part of the image to the first region, and a second feature amount relating to color components in each of the first region and the second region;

determine a strength of color in the first region in the image;

determine an interest level for the first region based on a difference for the first feature amount between the first region and the second region, a difference for the second feature amount between the first region and the second region, and an importance for each of the differences in the first and second feature amounts, wherein the importance for the difference for the first feature amount and the importance for the difference for the second feature amount is determined based on the strength of color; and detect a region of interest among the candidate region of interest in the image by using the interest level.

19. The apparatus according to claim 18, wherein the processor executes further instruction to, as the strength of color increases, cause the importance for the difference for the feature amount of the inner region to decrease and also cause the importance for the difference for the feature amount of the surrounding region to increase, and, as the strength of color decreases, cause the importance for the difference for the feature amount of the inner region to increase and also cause the importance for the difference for the feature amount of the surrounding region to decrease.

20. The apparatus according to claim 19, wherein the processor executes further instruction to use the importance of the difference of the feature amount of the inner region and the importance of the difference of the feature amount of the surrounding region to perform a weighted addition of the difference of the feature amount of the inner region and the difference of the feature amount of the surrounding region.

21. The apparatus according to claim 18, wherein the processor executes further instruction to multiply a gain value in accordance with the strength of color and each of the feature amount of the inner region and the feature amount of the surrounding region, and to equalize the importance of the difference of the feature amount of the inner region and the importance of the difference of the feature amount of the surrounding region in the acquiring of the interest level.

22. The apparatus according to claim 18, wherein the processor executes further instruction to detect as the candidated region a region of at least one of an in-focus region, a screen central region, and a tracked object region in the image, or a region corresponding to the region of interest in a temporally neighboring frame in a moving image.

23. The apparatus according to claim 18, wherein the surrounding region is a background region in the image.

24. The apparatus according to claim 23, wherein the background region is a partial region that includes at least an end portion of the image.

25. The apparatus according to claim 18, wherein the processor executes further instruction to use a luminance component to acquire as the feature amount of the inner region at least one of a pixel value average, a histogram illustrating a pixel distribution, and an edge amount, and to use a color component to acquire as the feature amount of the surrounding region that corresponds to the feature amount of the inner region at least one of a pixel value average, a histogram illustrating the pixel distribution and an edge amount.

26. The apparatus according to claim 18, wherein the processor executes further instruction to use an average value of the chroma of the inner region to acquire the strength of color.

27. The apparatus according to claim 18, wherein the processor executes further instruction to acquire an index for each of the regions of the image, and to detect at least one of the regions with the maximum index as the candidate region for the region of interest.

28. The apparatus according to claim 27, wherein the processor executes further instruction to acquire, for each region of the image, the index using a difference for a feature amount in an inner region and a surrounding region of the each region, wherein the feature amount is at least one of a pixel value average, a histogram indicating a pixel value distribution and an edge amount.

29. The apparatus according to claim 18, further comprising an image sensor constructed to capture the image, wherein focus for the image sensor is determined based on the detected region of interest in the image.

30. The apparatus according to claim 18, further comprising an image sensor constructed to capture the image, wherein exposure for the image sensor is determined based on the detected region of interest in the image.

31. The apparatus according to claim 20, wherein the processor executes further instruction to acquire the interest level by using the importance of the difference of the feature amount of the inner region and the importance of the difference of the feature amount of the surrounding region to perform a weighted addition of the difference of the feature amount of the inner region and the difference of the feature amount of the surrounding region.

32. The apparatus according to claim 18, wherein the processor executes further instruction to acquire a first weight for the difference for the feature amount of the inner region and a second weight for the difference for the feature amount of the surrounding region, based on the strength of color; and
    to acquire the interest level based on the first weight and the second weight.

33. A control method of an image processing apparatus, the control method comprising:
    determining an index of a region of an image using a difference between a feature amount of an inner region and a feature amount of a surrounding region for the region, the feature amount including at least one of a pixel value average, a histogram indicating a pixel value distribution and an edge amount;
    detecting at least one region among the regions of the image based on the index as a candidate region of interest in the image;
    setting the detected candidate region as a first region that is part of the image;
    determining a first feature amount relating to luminance components in each of the first region and a second region that is a different part of the image to the first region;
    determining a second feature amount relating to color components in each of the first region and the second region;
    determining a strength of color in the first region in the image;
    determining an interest level for the first region based on a difference for the first feature amount between the first region and the second region, a difference for the second feature amount between the first region and the second region, and an importance for each of the differences in the first and second feature amounts, wherein the importance for the difference for the first feature amount and the importance for the difference for the second feature amount is determined based on the strength of color; and
    detecting a region of interest among the candidate region of interest in the image by using the interest level.

34. A non-transitory computer-readable storage medium storing a program for causing a computer to execute a control method of an image processing apparatus, the control method comprising:
    determining an index of an image using a difference between a feature amount of an inner region for the region and a feature amount of a surrounding region for the region, the feature amount including at least one of a pixel value average, a histogram indicating a pixel value distribution and an edge amount;
    detecting at least one region among the regions of the image based on the index as a candidate region of interest in the image;
    setting the detected candidate region as a first region that is part of the image;
    determining a first feature amount relating to luminance components in each of the first region and a second region that is a different part of the image to the first region;
    determining a second feature amount relating to color components in each of the first region and the second region;
    determining a strength of color in the first region in the image;
    determining an interest level for the first region based on a difference for the first feature amount between the first region and the second region, a difference for the second feature amount between the first region and the second region, and an importance for each of the differences in the first and second feature amounts, wherein the importance for the difference for the first feature amount and the importance for the difference for the second feature amount is determined based on the strength of color; and detecting a region of interest among the candidate region of interest in the image by using the interest level.

\* \* \* \* \*